United States Patent [19]
Reed

[11] 3,857,426
[45] Dec. 31, 1974

[54] TREAD COVER FOR PNEUMATIC TIRE

[76] Inventor: James W. Reed, 1648 Vernon Dicks Dr., Eau Gallie, Fla. 32935

[22] Filed: Feb. 14, 1974

[21] Appl. No.: 442,591

[52] U.S. Cl.............. 152/185, 152/173, 152/189, 152/242
[51] Int. Cl........................................... B60c 27/10
[58] Field of Search .......... 152/173, 178, 185, 189, 152/225, 242, 228, 177

[56] References Cited
UNITED STATES PATENTS

| | | | |
|---|---|---|---|
| 929,203 | 7/1909 | Fletcher | 152/177 |
| 1,209,442 | 12/1916 | Jablonski | 152/189 |
| 1,399,430 | 12/1921 | Ink | 152/189 |
| 1,403,385 | 1/1922 | Burt | 152/189 |
| 1,752,024 | 3/1930 | Parker | 152/177 |
| 2,348,256 | 5/1944 | Hollis | 152/185 |

Primary Examiner—Drayton E. Hoffman
Attorney, Agent, or Firm—Roger L. Martin, Esq.

[57] ABSTRACT

A tread cover for a pneumatic tire has an endless annular casing with flexible marginal side portions that overlay the tire side walls during use. The casing has a pliant rubber matrix with cordage for reinforcement that is arranged to permit elastic deformation of areas of one of the side portions to thereby facilitate the installation of the cover on a tire and to provide a transverse cord length arrangement that enables the centrifical forces which are realized during use of the cover to be transmitted to the members retaining the cover in place primarily as tensile forces acting along the cord lengths.

4 Claims, 6 Drawing Figures

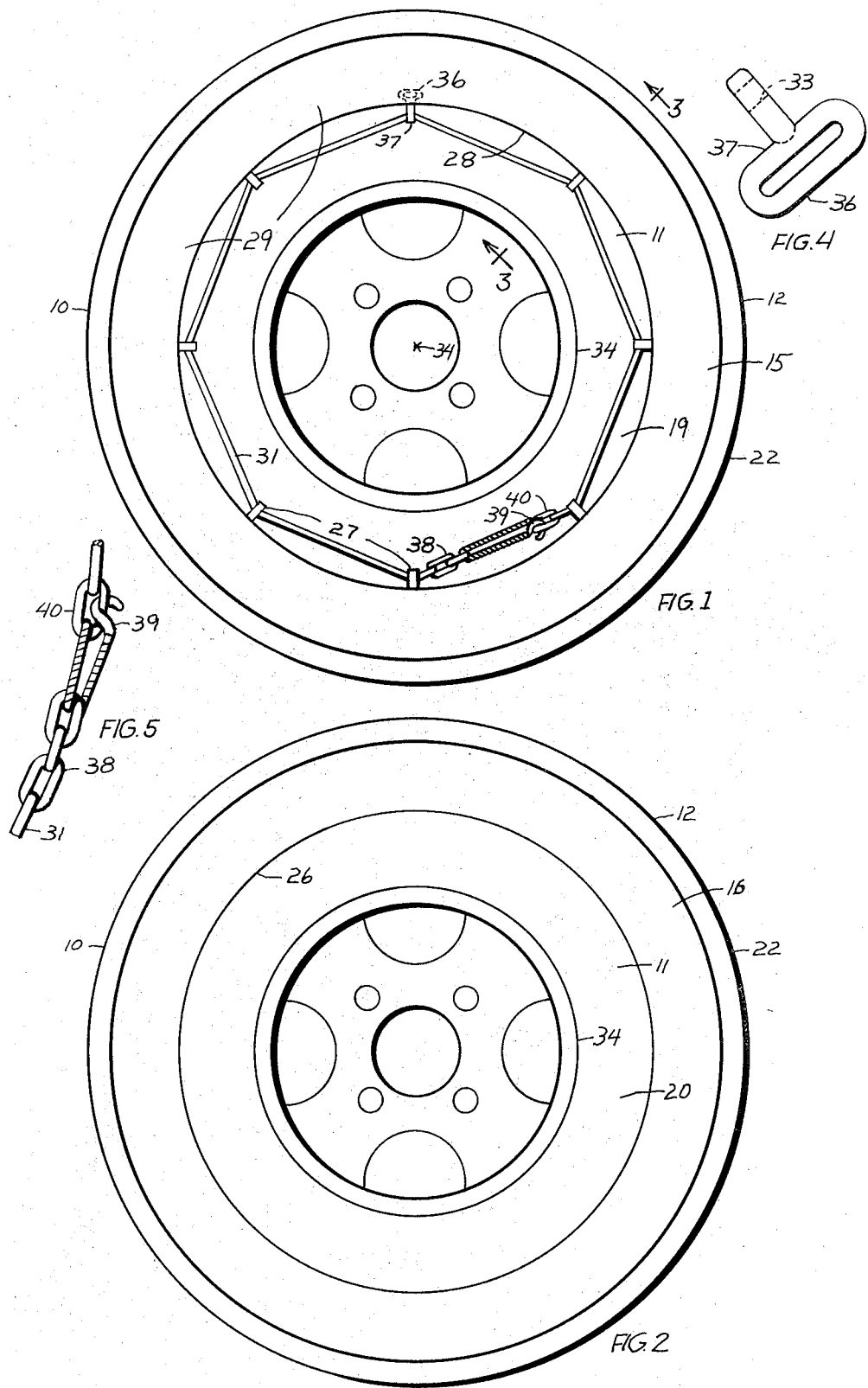

TREAD COVER FOR PNEUMATIC TIRE

This invention relates to an improved tread cover for pneumatic tires.

The use of tread covers for pneumatic tires has been previously advocated as a means for extending the useful life of such tires and as a means for adapting the conventional road tires to use on snow and ice covered pavements where tread designs embodied in the covers can provide greater traction and resistance to slippage than those embodied in the conventional pneumatic road tires. Covers for pneumatic tires have also been advocated as a means for adapting conventional road tires for off road usages where muddy, sandy and other terrains interfere with vehicular movement.

Much of the prior art relating to pneumatic tire covers has developed around the use of old and discarded tires or parts thereof as components of the pneumatic tire tread covers. The thought has been that much of the structure of the used and discarded tires is salvagable and reusable. The general approach previously taken in this respect has been to use segments of the discarded tire casings in the structure of the tread covers and to provide an appropriate means for securing the segments in an end to end relation at the perimeter of the covered tire.

The results have not been to successful, however. For one, when the used tires are cut into segments, the reinforcing cords are cut, and the structure is weakened. In addition, the rubber in most used tires has appreciably deteriorated by the time they have been discarded so that it is difficult to provide a practical and efficient means for interconnecting the segments in the tread cover without the segment connections tearing out from the segments during use of the covers.

Apart from the above, the use of segmented tire covering structures has been less than satisfactory because the covers tend to creep around the perimeter of the covered tire during use. This tends to accelerate the wear of the tire covers and causes damage to the segment connecting linkages. It also creates considerable road noise.

The creep problem is mainly attributed to the inability when using segmented structures to provide a tight fitting sheath-like covering which will adhere to and resist circumferential movement on the covered tire. The covering segments in most prior art cases are loosely linked together in the assembled tire cover. As a result, the segments move relative to the tire because of centrifical forces and this enables foreign objects such as ice, sand and gravel to become lodged between the covering segments and covered tire. These objects contribute to the creep problem and accelerate both tire and cover wear.

The ideal tread cover which would provide a sheath-like fit on the tire would be one having an endless annular casing with endless marginal portions that overlay the opposite side walls of the covered tire. However, one of the problems which is encountered in designing such a sheath-like tire covering structure lies in the practical requirement that the tread covering be so adapted as to be capable of installation on the tire without the need for deflating the tire and without the need for removing the tire from the vehicle. Any tread covering having an endless annular casing with endless marginal portions must of necessity be made from flexible rubber materials that are reinforced and hence the mentioned practical requirement imposes a problem in designing any practical and efficient reinforcing structure for the vulcanized materials that would be used in manufacturing the endless covering.

A general object of the invention is to provide an improved tread cover for pneumatic tires. Yet another object is to provide an improved tread cover for pneumatic tires that resists circumferential movement on the tires during use. Yet another object is to provide an improved tread cover for pneumatic tires which provides a sheath-like fit on a tire when installed in place and which can be installed on the tire without the need for deflating the pneumatic tire. Yet another object is to provide a tread cover for pneumatic tires which has an endless casing with endless marginal portions that overlay the tire side walls when installed on the tire and which embodies an effective and efficient structure for reinforcing the vulcanized materials used in the structure of the cover.

In accord with the invention, the inventor provides a generally U-shaped, endless annular casing that has an endless marginal portions which overlap the side walls of a pneumatic tire when in use. The casing is made with a vulcanized rubber material which provides a pliable structure throughout the casing and which is reinforced by flexible lengths of nylon, polyester or other suitable cord-type reinforcing material. The lengths are so embedded in the pliable structure that the endless center portion of the annual casing and one of the endless marginal portions thereof are, as a practical matter, inelastic and incapable of being stretched. On the other hand, the other marginal portion has elastic areas that are elastically deformable and capable of being stretched to facilitate the installation of the cover on a pneumatic tire when the latter is inflated and mounted on a vehicle. As will be subsequently seen, to facilitate the arrangement of the reinforcing cord lengths in the casing structure, the inventor utilizes a plurality of elements that are spaced apart and partially embedded in the pliable structure along the edge of one of the marginal portions. On the other hand, a flexible inextensible annular wire or comparable element is embedded along the edge of the other marginal portion. The cordage under such circumstances is strung between the elements in the marginal portion and the annular element in the other marginal portion. The reinforcing arrangement is such that the cord lengths extend transversely of the center portion of the casing and facilitates the provision of elastic and inelastic areas in the pliable casing structure. The casing is secured to the tire by a wire or comparable elongated element that engages the partially embedded elements and is drawn down tight to provide a sheath-type fit on the tire that minimizes the creep problem. The casing is also provided with a liner of soft sponge-type rubber that is pressed into the crevices of the tire tread to also aid in overcoming the creep problem.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 1 is a side elevational view of a tread cover embodying the principals of the invention as seen when installed on a pneumatic tire, the view being taken at the marginal side of the cover which contains the flexible areas;

FIG. 2 is an elevational view at the opposite side of the tread cover shown in FIG. 1;

FIG. 4 is an isometric view of an element that is used in securing the reinforcing cords in the casing structure of the tire shown in FIG. 1;

FIG. 5 is a perspective view of a linkage used in fastening the tread cover to the tire.

Figure 3:
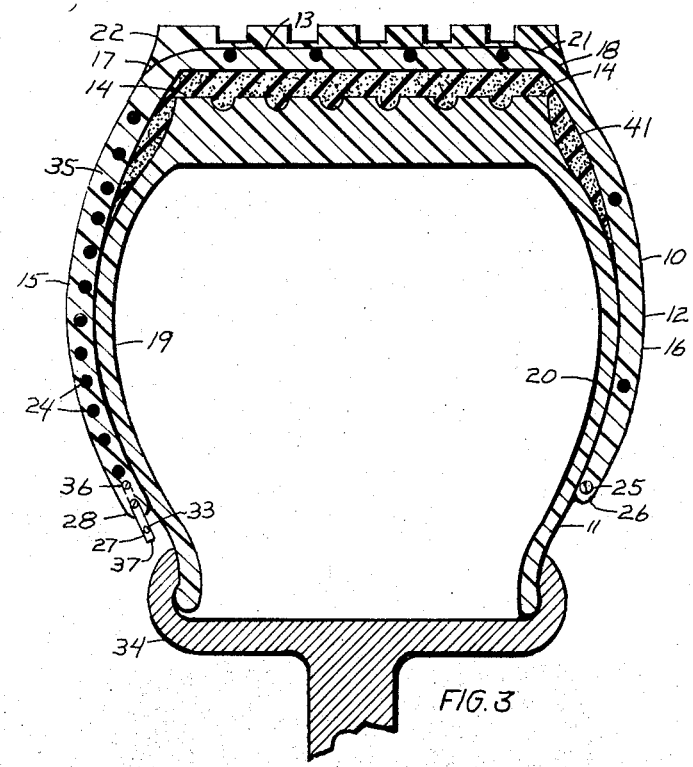
FIG. 3 is a transverse sectional view taken generally along the lines 3—3 of FIG. 1.
Figure 6:
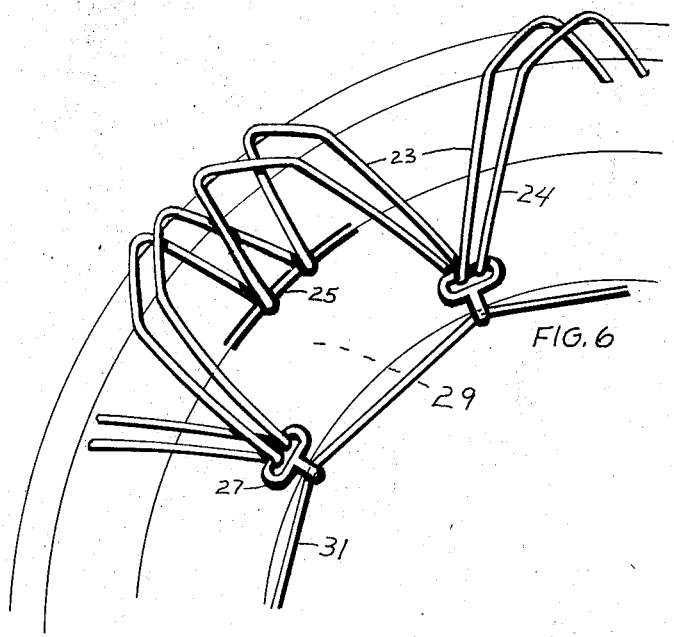
FIG. 6 is an isometric view of a fragment of the tire cover with parts removed to illustrate the arrangement of the cord lengths used in reinforcing the vulcanized material.

Reference is now made to the drawings and wherein a tread cover embodying the principles of the invention is designated at 10 and seen in FIGS. 1 through 3 as installed on a conventional pneumatic automotive tire 11. The tire 11 is shown as mounted on a conventional automotive wheel 34.

The tread cover 10 includes an endless, annular reinforced rubber casing 12 which has an endless center portion 13. This center portion 13 is adapted, as seen in FIG. 3, to overlay the tire tread 14 at the perimeter of the pneumatic tire 11 when the cover 10 is installed on the tire for its intended use. Casing 12 also has endless, annular side marginal portions 15 and 16 that are integrally connected to and at the opposite sides 17 and 18 of the center portion 13 during the process of assembling the tread cover. These side portions 15 and 16, as seen in FIG. 3, overlap the opposite side walls 19 and 20 of the pneumatic tire 11 when the cover 10 is installed in place on the tire.

The inside of the casing 12 has an annular inner liner 41 that confronts the tread 14 and side walls 19 and 20 of the tire 11 when the cover is installed on the tire. This liner 41 is made from a soft pliable rubber or comparable vulcanizable material that conforms to the surface contour of the tire and flow into the crevices of the tire tread 14 during use of the cover. The liner 41 is fixed to the inside surface of the casing by vulcanization during the assembly of the cover.

The casing 12 is made from vulcanized rubber that provides a pliable matrix 35 in the casing structure. The matrix 35 is reinforced by means of flexible cords that are embedded in the matrix during the vulcanizing process and these cores may be made of steel or from suitable synthetic materials such as nylon or one of the polyesters that are commonly employed in reinforcing conventional tire structures. At the perimeter 21 of the casing structure, the casing 10 is equipped with an endless tread 22 of hard rubber that is vulcanized to provide an integral bond with the endless center portion 13 of the casing. The tread 22 may be of any suitable design which will fulfill the use objectives of the cover, and, the tread 22, of course, provides the ground contacting wear member of the tire tread cover 10.

The marginal side portions 15 and 16 of the casing are spaced apart in the casing structure and are formed integral with the center portion 13 during the vulcanizing process. The vulcanized rubber matrix 35 of the casing is reinforced by generally inextensible cordage designated at 24. The cords are embedded in the matrix 35 in a manner such as to have cord lengths 23 which extend transversely of the center portion of the casing and which interconnect a flexible annular element 25 at one edge 26 of the casing with a plurality of elements 27 that are fixed at the opposite edge of the casing.

The marginal side portion 16 of casing 12 has a flexible wire that is wound to form a flexible yet inextensible annular element 25 that is embedded in the pliant rubber matrix 35 of the casing along the circular edge 26 of side portion 16 during the vulcanizing process. The opposite marginal side portion 15, on the other hand, has a plurality of metal elements 27 that are fixed to the casing and circumferentially spaced apart along the circular edge 28 of this side marginal portion 15 thereof. Each element 27 has an eyelet 36 which is embedded in the rubber matrix of the casing during the vulcanizing process. Each element also has an apertured portion 37 which projects outwardly of the rubber matrix at the edge 28 of the portion 15.

In assembling the cordage 24 during the fabrication of the casing 12, the cords are strung through the spaced eyelets 36 but between passes through the spaced eyelets 36, the cords are passed through the annular element 37 at the opposite side edge 26 of the casing structure. This provides a generally angular and overlapping cord length arrangement in the matrix of the side marginal portion 16 and which generally prevents any substantial elastic deformation of the marginal portion 16. On the other hand, in the opposite side marginal portion 15 of the casing, the arrangement is such that the cord lengths 23 converge on the eyelets 36 of the annular elements 37 and this leaves a generally triangular area 29 in the space between the adjacent eyelets and in which the casing lacks reinforcement. In these areas 29 of the casing, the casing remains elastic and hence can be stretched to facilitate the installation of the tread cover 10 on the tire 11 without the need for deflation or removal of the tire from the vehicle.

The apertured portions 37 of the metal elements 27 project generally radially of the circular edge 28 of the casing and each portion has a hole or aperture 33 for receiving a wire 31. The casing 12 is secured in a sheath-type fit on the tire by means of the elongated wire element 31 and this wire element extends generally circumferentially about the axis 34 of the casing and successively through the holes 33 in the elements along the edge 28. One end of the wire length 31 has several attached chain lengths 38 and the other end has an attached hook element 39 that can be threaded through a selected one of the lengths 38 and drawn back to engage another chain length 40 seen in FIG. 3 so as to secure the cover to the tire and maintain the elements 37 inwardly of the center portion during use of the cover.

The arrangement illustrated has several advantages among which may be mentioned the fact that when the cover is drawn down tightly on the tire 11 by tightening the wire length 31, most of the tightening forces applied along the transverse lengths of the cordage so that a sheath-like fit is attained when the cover is installed on the tire. Similarly, centrifical forces that are applied to the tread cover 10 during rotational movement of the tire 11 are resisted primarily by tensile forces acting along the transverse lengths of the cordage material. With the sheath-like fit on the pneumatic tire, the pliant liner is pressed into the cracks and crevices in the tire tread 14 and this additionally aids in preventing circumferential movement of the cover 10 on tire 11.

Other cordage arrangements may, of course, be used in reinforcing the casing although it is essential that at least one of the marginal portions have elastic areas that enable the tread cover to be installed upon the tire without the need for deflating the tire or removing it from the vehicle.

While only a certain preferred embodiment of this invention has been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A tread cover for a pneumatic tire comprising an endless annular casing having an axis and a matrix of pliable vulcanized rubber material, said casing comprising an annular center portion which has opposite sides and is adapted to overlay the tread on the tire, and opposite annular marginal portions which are integrally joined to the center portion at the respective opposite sides thereof and which are spaced apart and respectively adapted to overlay the opposite side walls of the tire, each of said marginal portions having an endless edge that is offset from said center portion toward said axis, flexible annular means that is circumferentially inextensible and embedded in the casing matrix along the edge of one of said marginal portions, a plurality of elements which are fixed to and circumferentially spaced apart along the edge of the other marginal portion, reinforcing means having cord lengths which are embedded in said matrix and which extend transversely of the center portion to interconnect said elements and said flexible annular means, said other marginal portion having elastically deformable areas respectively located in the spaces between said elements, releasable means connected to said elements for maintaining said elements inwardly of said center portion during use of said cover, and a tread of vulcanized rubber material integrally joined to the center portion of said casing.

2. A tread cover for a pneumatic tire in accord with claim 1 where each of said elements comprises an eyelet embedded in said matrix at the edge of said other marginal portion, and where said reinforcing means comprises a cord that is threaded through said eyelets and said flexible annular means in said matrix.

3. A tread cover for a pneumatic tire in accord with claim 1 where each of said elements has an apertured portion that projects outwardly of the matrix, and where said releasable means comprises elongated inextensible flexible means extending along the edge of said other marginal portion and through the apertures in the apertured portions of said elements.

4. A tread cover for a pneumatic tire in accord with claim 1 further comprising an annular liner fixed to and located at the inside of the casing, said liner being made from soft pliable material that is deformable to conform to the exterior surface contour of the tire.

* * * * *